(12) United States Patent
Lo

(10) Patent No.: US 9,546,783 B2
(45) Date of Patent: *Jan. 17, 2017

(54) MODULAR LED FLOOD LIGHT

(76) Inventor: Chi Wai Lo, Tsuen Wan (HK)

( * ) Notice: Subject to any disclaimer, the term of this patent is extended or adjusted under 35 U.S.C. 154(b) by 770 days.

This patent is subject to a terminal disclaimer.

(21) Appl. No.: 13/301,483

(22) Filed: Nov. 21, 2011

(65) Prior Publication Data

US 2012/0063132 A1 Mar. 15, 2012

Related U.S. Application Data

(63) Continuation of application No. 12/420,314, filed on Apr. 8, 2009, now Pat. No. 8,061,869, and a
(Continued)

(30) Foreign Application Priority Data

Nov. 11, 2008 (CN) ...................... 2008 2 0203225 U

(51) Int. Cl.
*F21V 7/20* (2006.01)
*F21V 29/74* (2015.01)
(Continued)

(52) U.S. Cl.
CPC .............. *F21V 29/74* (2015.01); *F21S 2/005* (2013.01); *F21S 8/088* (2013.01); *F21S 48/328* (2013.01); *F21V 29/004* (2013.01); *F21V 29/71* (2015.01); *F21V 29/745* (2015.01); *F21V 29/75* (2015.01); *F21V 29/763* (2015.01); *F21V 29/767* (2015.01); *F21S 9/03* (2013.01); *F21V 15/013* (2013.01); *F21V 15/015* (2013.01); *F21V 19/001* (2013.01); *F21V 19/02* (2013.01); *F21V 21/116* (2013.01); *F21V 31/005* (2013.01); *F21W 2131/103* (2013.01); *F21W 2131/105* (2013.01); *F21Y 2101/00* (2013.01); *F21Y 2103/10* (2016.08); *F21Y 2113/00* (2013.01); *F21Y 2115/10* (2016.08); *Y02B 20/72* (2013.01)

(58) Field of Classification Search
USPC ........ 362/153.1, 218, 235, 249.02, 294, 373
See application file for complete search history.

(56) References Cited

U.S. PATENT DOCUMENTS 8,061,869 B2 * 11/2011 Lo ............................ 362/249.02
2008/0080189 A1 * 4/2008 Wang ............................ 362/294
(Continued)

*Primary Examiner* — Andrew Coughlin
*Assistant Examiner* — Meghan Ulanday
(74) *Attorney, Agent, or Firm* — James A. Italia; Italia IP

(57) ABSTRACT

A modular luminaire which uses LED light sources. The basic frame comprises two end pieces compressed together by through bolts. At least one elongated heat sink is compressed between the end pieces. Each heat sink may bear a plurality of LEDs mounted on a printed circuit board which may have an integral metallic backplate, and is installed on one of the heat sinks with a layer of heat conductive grease therebetween. The heat sinks have fins projecting in three directions, the fourth direction being accounted for by the LEDs, and are rotatable about their longitudinal axes to adjust direction of light propagation. The heat sinks are arrayed in an arc, so that the outside heat sinks shield observers from direct glare from opposed heat sinks. Heat sinks may be extruded to form cooling fins and slots which may receive fasteners such as screws.

6 Claims, 8 Drawing Sheets

Related U.S. Application Data continuation of application No. 12/420,352, filed on Apr. 8, 2009, now Pat. No. 7,633,684, and a continuation of application No. 12/420,332, filed on Apr. 8, 2009, now abandoned.

(51) Int. Cl.
| | |
|---|---|
| *F21V 29/71* | (2015.01) |
| *F21S 8/10* | (2006.01) |
| *F21S 2/00* | (2016.01) |
| *F21S 8/08* | (2006.01) |
| *F21V 29/00* | (2015.01) |
| *F21V 29/75* | (2015.01) |
| *F21V 29/76* | (2015.01) |
| *F21V 15/01* | (2006.01) |
| *F21V 15/015* | (2006.01) |
| *F21V 19/00* | (2006.01) |
| *F21V 19/02* | (2006.01) |
| *F21V 21/116* | (2006.01) |
| *F21W 131/103* | (2006.01) |
| *F21W 131/105* | (2006.01) |
| *F21V 31/00* | (2006.01) |
| *F21S 9/03* | (2006.01) |
| *F21Y 113/00* | (2016.01) |
| *F21Y 101/00* | (2016.01) |

(56) References Cited

U.S. PATENT DOCUMENTS

| | | | |
|---|---|---|---|
| 2009/0168417 A1* | 7/2009 | Zhang et al. | 362/234 |
| 2010/0118564 A1* | 5/2010 | Shen et al. | 362/647 |

\* cited by examiner

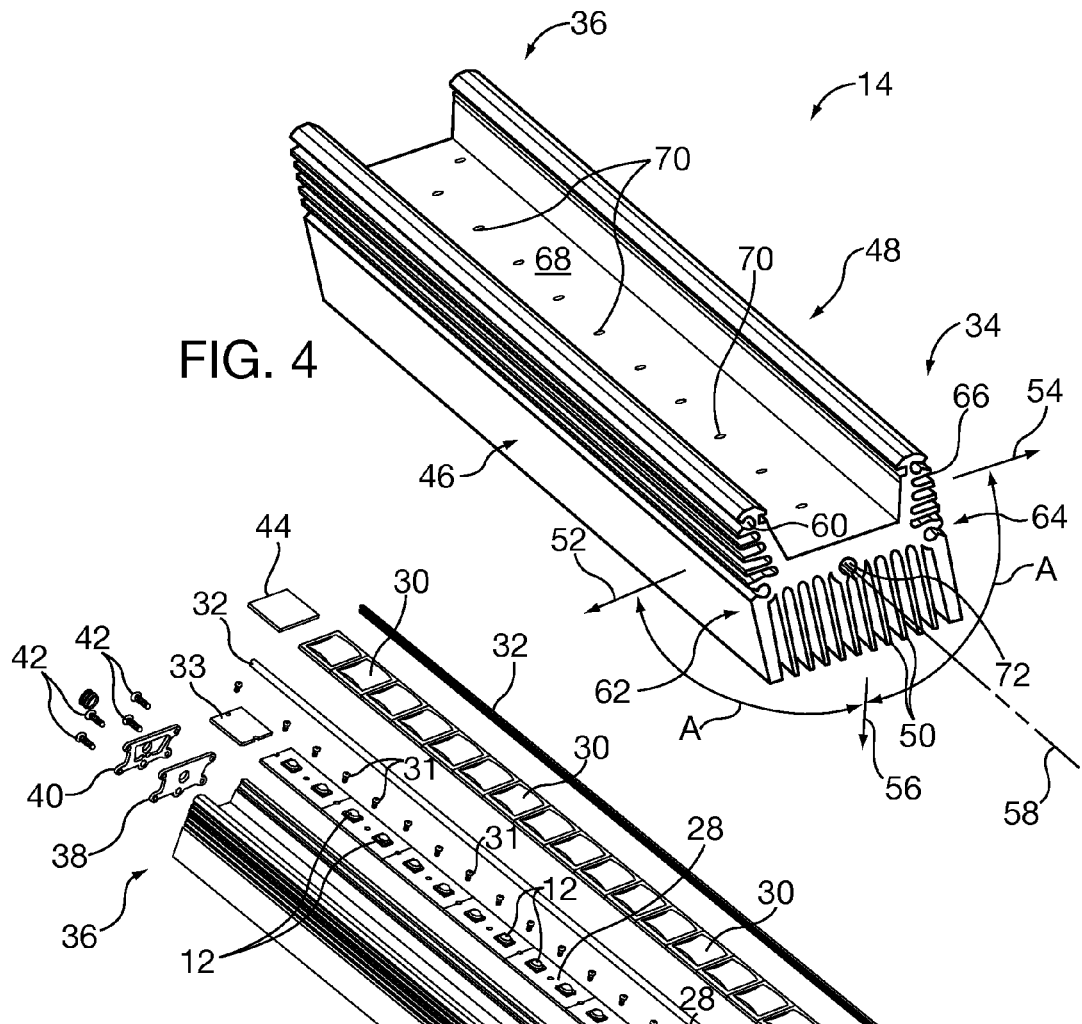

MODULAR LED FLOOD LIGHT

CROSS-REFERENCE TO RELATED APPLICATIONS

This application claims the benefit of the filing date under 35 USC 119(a) of Chinese Patent Application No. 200820203225.7, filed Nov. 11, 2008, the contents of which are incorporated herein by reference. This application is also related to HEAT SINK FOR MODULAR LED FLOOD LIGHT, application Ser. No. 12/420,332 filed Apr. 8, 2009 now abandoned. This application is also related to LENS FOR LIGHT EMITTING DIODES MOUNTED ON A HEAT SINK, application Ser. No. 12/420,352 filed Apr. 8, 2009 now U.S. Pat. No. 7,633,684. This application claims priority to and incorporates by reference application Ser. No. 12/420,314 filed Apr. 8, 2009 now U.S. Pat. No. 8,061,869 titled MODULAR LED FLOOD LIGHT. All applications are of common ownership with the present invention.

FIELD OF THE INVENTION

The present invention relates to illumination, and more particularly to a flood light having modular construction.

BACKGROUND OF THE INVENTION

Lights for illuminating large areas such as roads, parking lots, fields, and the like have long been provided. Lighting technology for such lights has progressed from incandescent to specialized high powered types such as sodium vapor and mercury vapor. However, it has become desirable to utilize more efficient light sources, as efficiency relates to units of light output per unit of electrical input.

Light emitting diodes (hereinafter LEDs) are among the most efficient types of light sources commercially available today. LEDs enjoy not only relatively high efficiency, but offer long life and relatively uncomplicated construction. LEDs have progressed to the point where white light producing LEDs could be employed in many applications.

Luminaires are typically produced in models each of which is designed to provide a predetermined amount of light, to have a specific predetermined construction or design, to project light in a predetermined pattern and in a predetermined quantity. Therefore, many different models must be made available so that the most suitable design may be selected for any given application. This leads to the situation that many different models must be designed, produced, and stocked, and replacement parts be made available for each model. While this situation offers great versatility in providing varieties of luminaires, such convenience comes at economic cost.

It would be desirable to offer different models having diverse outputs while minimizing the cost of luminaires of each model or capacity.

A need exists for mass producing high intensity flood lamps using white LEDs in many light output capacities, so that individual luminaires employing LEDs may compete with established high intensity luminaires.

SUMMARY OF THE INVENTION

The present invention addresses the above stated need by providing a design for luminaires which utilize LEDs which lends itself to producing many different output configurations and capacities while using a common core of components for construction of such luminaires. In one aspect, the present invention contemplates a modular design for LED using luminaires which is readily adjustable as to light source layout in two orthogonal directions. In another aspect of the invention, a luminaire may be assembled from a minimum number of component parts. According to a further aspect of the invention, a significant LED bearing component may be fabricated as an extrusion of indefinite length, which is readily cut to a desired length.

The LED bearing component carries a plurality of LEDs arranged serially. This component serves as a structural support for LEDs and their associated printed circuit boards and lenses, and also as a heat sink. For brevity, the LED bearing component will be referred to as a heat sink, it being understood that the functions described above and others are also satisfied by the heat sinks.

The length of each heat sink determines the length of the overall light source. Width of the light source may be established by selecting a desired number of heat sinks and mounting them parallel to one another.

The heat sinks may be mounted between two end pieces. These end pieces are compressed together by a plurality of through bolts. The overall length of the support for the heat sinks may be varied by simply selecting through bolts of appropriate lengths.

One of the end pieces accommodates an integral clamp, which allows the luminaire to be mounted to a pole. The clamp accommodates many different dimensions and configurations of poles, so that the novel luminaire need not require careful coordination with any one design or model of pole.

The end pieces are somewhat arcuate, so that the pattern of LEDs mounted thereto is that of a curved plane. This both allows for advantageous projection of light in overlapping beams, and also provides an inherent glare suppression feature for protecting observers at a distance from the luminaire. Overlapping beams of light assure illumination coverage even in the event that one or several LEDs fail.

Electrical components serving the individual LEDs may be mounted to the luminaire in a way that avoids interfering with heat dissipation through the heat sinks.

It is therefore an object of the invention to provide a design for a luminaire which utilizes LEDs which is both modular and also readily adjustable as to dimensions of the array of individual LEDs.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is an exploded top perspective detail view of components seen at the center of FIG. 1.

FIG. 4 is a top perspective detail view of the lowermost component of FIG. 3.

DETAILED DESCRIPTION

Figure 1:
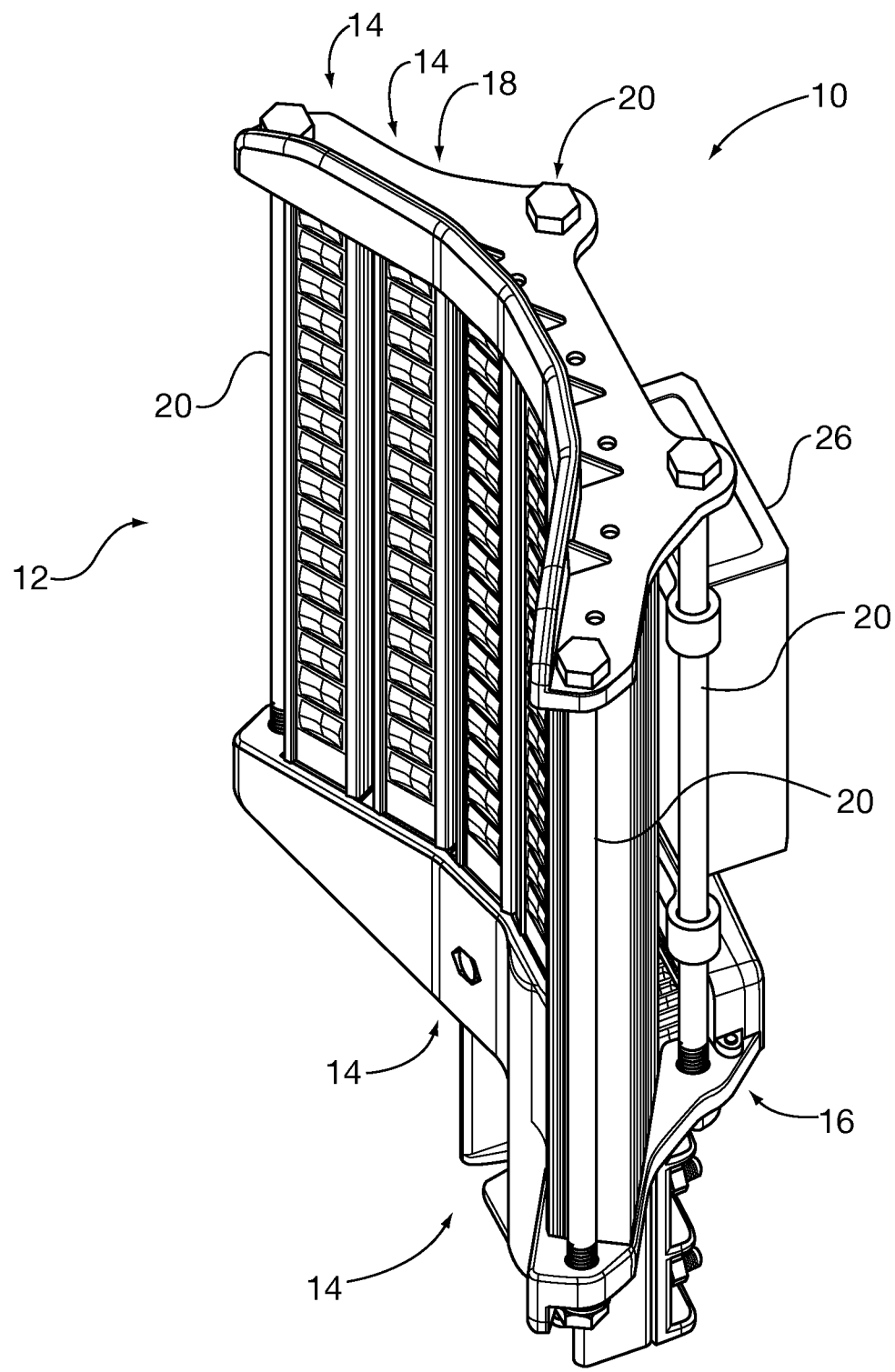
FIG. 1 is a top perspective view of a modular luminaire according to at least one aspect of the invention.

FIG. 1 of the drawings shows a modular luminaire 10 according to at least one aspect of the invention. The modular luminaire 10 is of a type which may be used as a street light, for example. The modular luminaire 10 may comprise a plurality of LEDs 12 (not all of which are individually called out by reference numeral) arranged along and ultimately supported by heat sinks 14 (see FIG. 2). The heat sinks 14 are suspended between a proximal end piece 16 and a distal end piece 18, which are in turn compressed towards one another and against the heat sinks 14 by through bolts 20. The through bolts 20 extend from the proximal end piece 16 to the distal end piece 18 and unite the proximal end piece 16 and the distal end piece 18, while drawing the proximal end piece 16 towards the distal end piece 18 while entrapping each one of the heat sinks 14 between the proximal end piece 16 and the distal end piece 18.

Figure 2:
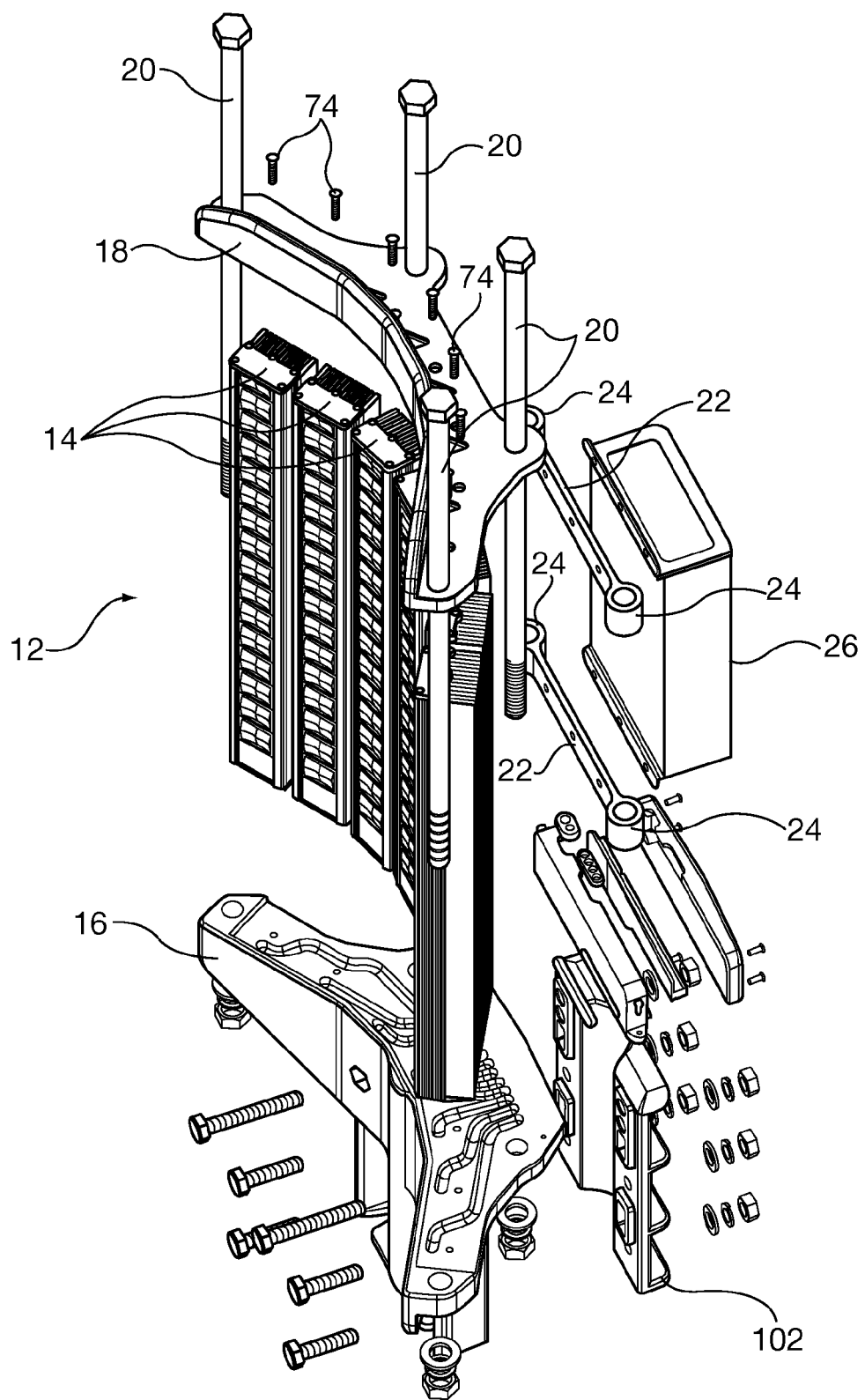
FIG. 2 is an exploded top perspective view of FIG. 1.

The component parts of the modular luminaire 10 are better seen in the exploded view of FIG. 2, to which attention is directed. Two yoke type brackets 22 are mounted to the modular luminaire 10 by passing the central two through bolts 20 through eyes 24 formed at the two ends of each bracket 22. Each bracket 22 thereby spans two through bolts 20.

A power converter 26 which converts AC power to DC power may be fastened to the brackets 22. It should be noted that the brackets 22 and the power converter 26, although close to the heat sinks 14, are out of contact with the heat sinks 14, so that heat dissipation from the heat sinks is not unduly obstructed.

FIG. 3 shows components of an individual heat sink 14. A plurality of LEDs 12 is mounted on printed circuit boards 28 (not all of which are individually called out by reference numeral) in conventional fashion. Each LED 12 may have its own individual or dedicated printed circuit board such as a printed circuit board 28, or alternatively, one printed circuit board may serve more than one LED 12. The printed circuit boards 28 may be mounted to the heat sink 14 using screws 31 (not all of which are individually called out by reference numeral), with further mounting details to be described hereinafter. A lens 30 (not all of which are individually called out by reference numeral) is provided to cover each LED 12. Each lens 30 may be dedicated to one LED 12, so that there may be a one-to-one relationship between LEDs 12 and lenses 30. This relationship contributes to modularity of the modular luminaire 10 in that for any number of LEDs 12 accommodated by any heat sink 14, a corresponding number of lenses 30 may be used. Customization of length of the lens, such as cutting to a length or molding lenses 30 to specific lengths, is not necessary.

Each heat sink 14 may be said to have a proximal end 34, a distal end 36, and a length defined therebetween, although designation as proximal or distal in this case is only a semantic convenience. For example, the proximal end 34 may be that engaged and supported by the proximal end piece 16, while the distal end 36 may be that supported by the distal end piece 18. The LEDs 12 are located between the proximal end 34 and the distal end 36, and may for example be ordered in straight rows. Of course, other arrays of LEDs 12 on each heat sink 14 are possible.

Because the modular luminaire 10 may be employed outdoors, seals are provided to exclude water and dust from the vicinity of the LEDs 12 and the circuit boards 28. For example, lateral sealing may be provided by seals such as silicone strip seals 32. Respective proximal and distal ends 34, 36 of each heat sink 14 may be sealed respectively by gaskets 38 which may be secured in place by respective end plates 40. It should be made clear that the terms "proximal" and "distal", as applied to the heat sinks 14, are merely for semantic purposes. The end plates 40 may be secured to the heat sink 14 by screws 42. Protective barriers 44 may be provided to close the end of a row of lenses 30 should the latter leave a gap between the lenses 30 and the gasket 38.

FIG. 4 shows a heat sink 14 isolated from its associated seals, such as the seals 32 and the gaskets 28, LEDs 12, and printed circuit boards 28 is shown in FIG. 4. The heat sink 14 is seen to have lateral cooling fins 46, 48 and top cooling fins 50. The lateral cooling fins 46 may project in a direction represented by the arrow 52. The lateral cooling fins 48 may project in a direction represented by the arrow 54. The bottom cooling fins 50 may project in a direction represented by the arrow 56. The directions of the arrows 52, 54, 56 may be arranged such that each direction is perpendicular to an adjacent direction. Alternatively stated, a right angle A may exist between any two adjacent ones of the directions indicated by the arrows 52, 54, 56. However, it is not necessary that perpendicularity be present. It is desired that the cooling fins 46, 48, 50 face in three substantially different directions outwardly away from the central axis 58.

As employed herein, orientational terms such as top and bottom will be understood to refer to the orientations depicted in the referenced drawing figures. Therefore, orientational terms must be understood to provide semantic basis for purposes of description, and do not limit the invention or its component parts in any particular way. This also holds true as to designation of the fins 50 as being at the bottom of their associated heat sink 14. The location of the fins 50 may change due because a modular luminaire such as the luminaire 10 may be mounted in any orientation.

It will be seen that all of the fins are longitudinally oriented in that they are parallel to the central longitudinal axis 58 of the heat sink 14. Also formed in the heat sink 14 is a plurality of fastener thread receiving channels 60, 62, 64, 66, which extend along the length of their associated heat sink 14. Screws 42 (see FIG. 3) which may be self-tapping screws, or which may otherwise be sufficiently robust as to thread to the fastener thread receiving channels 60, 62, 64, 66 may be employed without the necessity of drilling and tapping screw holes. It will be appreciated that both the fins 46, 48, 50 and also the fastener thread receiving channels 60, 62, 64, 66 may be advantageously and inexpensively formed for example by an extrusion process, although other fabrication methods such as casting or injection molding could be employed if desired.

FIG. 4 also shows a mounting surface 68 for mounting the printed circuit boards 28 and fastener holes 70 for receiving fasteners to secure the printed circuit boards 28 to the heat sink 14.

Figure 5:
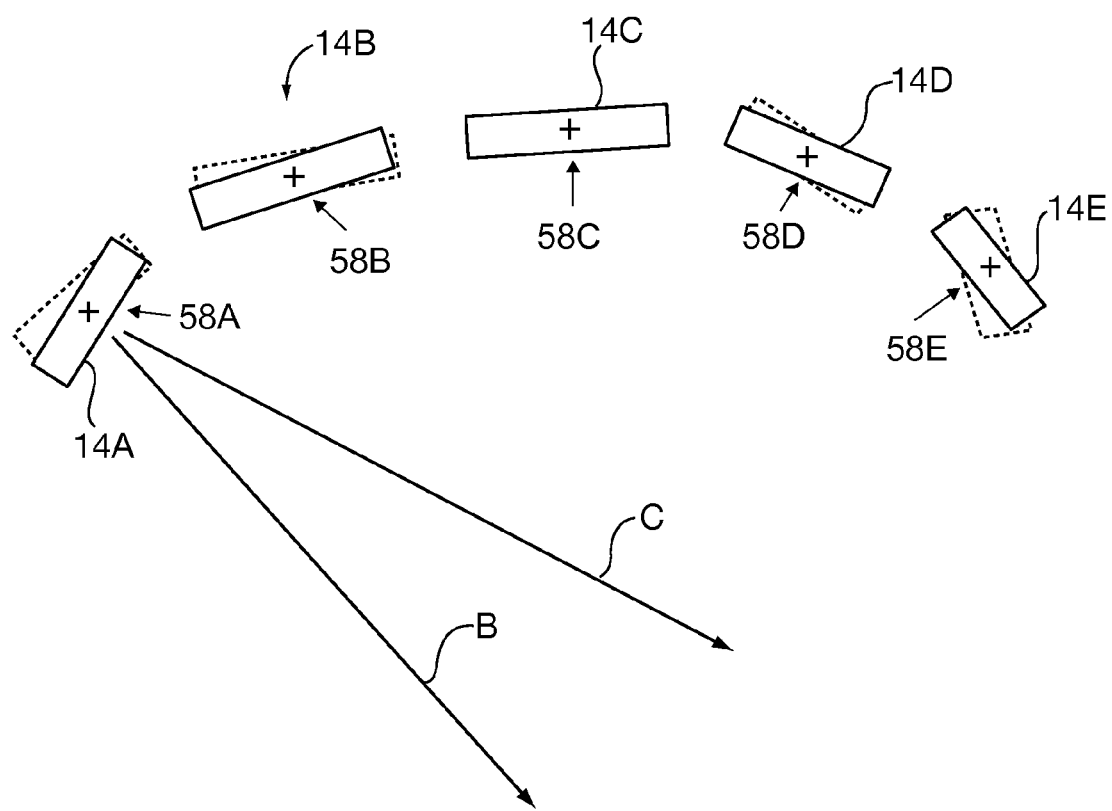
FIG. 5 is a diagrammatic representation of possible positions and adjustments to the direction of projection of light from LEDs, according to a further aspect of the invention.

A fastener hole 72 is formed at the central longitudinal axis 58 of the heat sink 14. The location of the fastener hole 72 enables angular adjustment of heat sinks 14 and hence of LEDs. Referring to FIG. 5, five representative heat sinks 14A, 14B, 14C, 14D, 14E are shown. These heat sinks 14A, 14B, 14C, 14D, 14E may be structural and functional counterparts to the heat sinks 14 described priorly, for example. The heat sinks 14A, 14B, 14C, 14D, 14E are angularly adjustable about their respective central longitudinal axes 58A, 58B, 58C, 58D, 58E. Representative angular adjustment of the heat sinks 14A, 14B, 14D, 14E is depicted, showing one position in solid lines and an alternative position in broken lines. Considering the heat sink 14A as an example, the directions of the center line of light propagation is indicated by the arrows B and C. The center heat sink 14C could be angularly adjusted if the resulting asymmetry of light projection were deemed not objectionable.

The proximal end piece 16 and the distal end piece 18 may be dimensioned and configured to hold the heat sinks 14 in the arcuate array depicted in FIGS. 1, 2, and 5. The arcuate array is seen when the heat sinks, such as the heat sinks 14A, 14B, 14D, 14E are viewed from their ends, as depicted in FIG. 5, and with the heat sinks oriented parallel to one another, as seen in FIGS. 1 and 2. In conclusion, centering of the fasteners such as the screws 74 (not all of the screws are called out by reference numeral) (see FIG. 1) for securing heat sinks 14 to the proximal end piece 16 and the distal end piece 18 within their respective heat sinks 14 enables each heat sink 14 to be angularly adjusted as to its mounting position by threading its fastening screw 74 into its respective centered fastener thread receiving channel 72 and rotating the heat sink 14 about its longitudinal axis 58 prior to tightening the through bolts 20.

The lenses 30 of the LEDs 12 are configured to project rectangular light beams. Because of this, uniform overlapping of light beams from the many LEDs 12 can be achieved. This results in more even lighting at the environmental surface (not shown) which is being illuminated.

Figure 7:
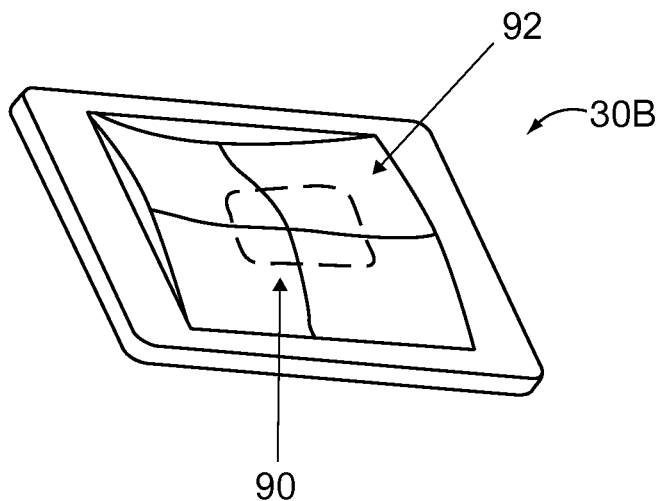
FIG. 7 is similar to FIG. 6, but shows a slightly different configuration of the subject lens.
Figure 6:
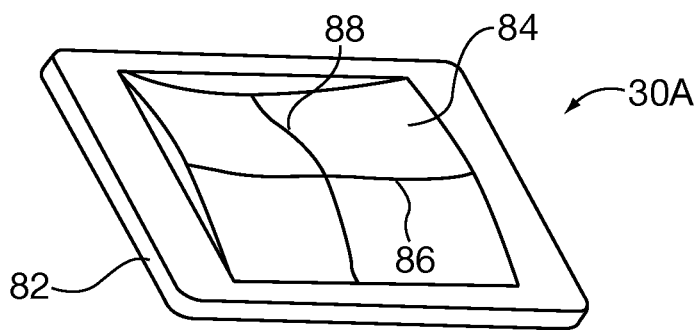
FIG. 6 is a top perspective view of an individual lens which may be representative of lenses which are shown along the upper right of FIG. 3.

FIGS. 6 and 7 show alternative possible configurations of lenses 30 which may project rectangular light beams from their associated LEDs 12. In FIG. 6, a lens 30A has a generally planar rectangular base 82 and a curved raised portion 84. The curved raised portion 84 may display curvature according to profile lines 86, 88, which are hypothetical entities superimposed over the lens 30A only to illustrate the nature of the curvature along two orthogonal axes.

FIG. 7 shows a generally similar lens 30B, the difference being a flat facet 90 formed at the apex of the curved surface 92 which apart from the flat facet 90 corresponds to the curved surface 84 of FIG. 6.

Figure 8:
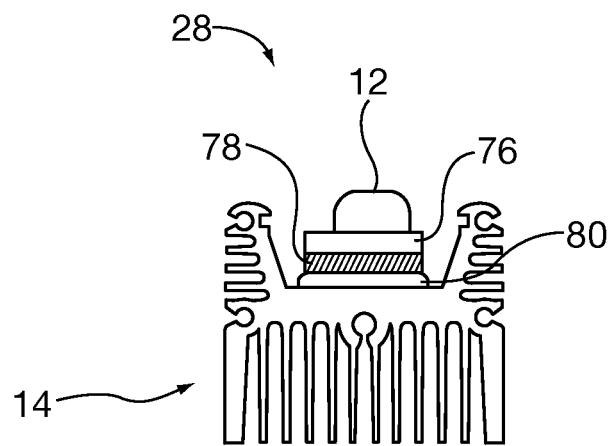
FIG. 8 is an exaggerated, diagrammatic end elevational view of the components of FIG. 3, shown assembled.

FIG. 8 shows further details of how an LED 12 and its associated printed circuit board 28 are mounted on a heat sink 14. LEDs 12 are mounted to their associated printed circuit boards 28 in conventional fashion. Each circuit board 28 may comprise an electrically insulative layer 76 on which conductive circuitry (not shown) is printed. Each circuit board 28 may comprise a metallic backing plate 78 which is integrated therewith. Each printed circuit board 28 may be mounted on a heat sink 14, with a layer of heat conductive grease 80 placed between the printed circuit board 28 and its associated heat sink 14.

Figure 9:
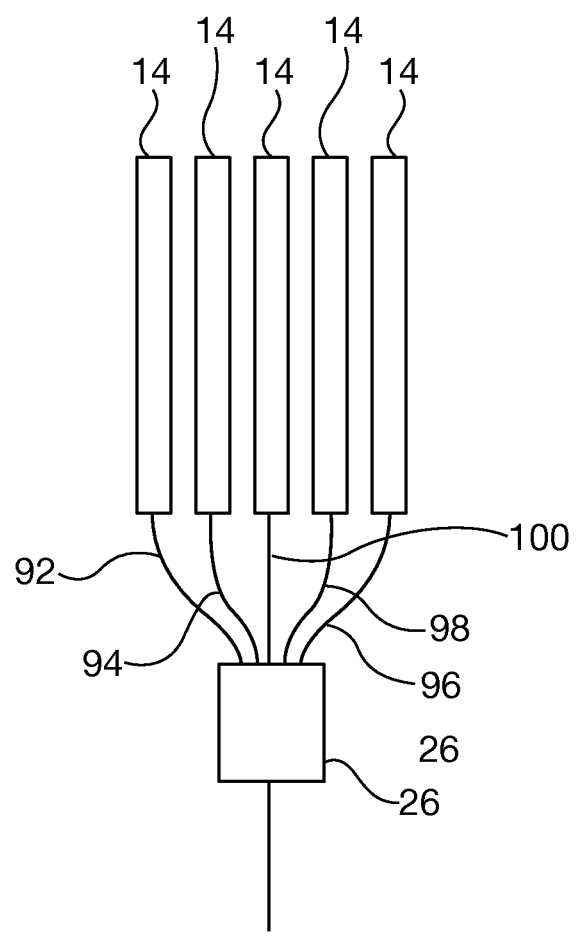
FIG. 9 is a diagrammatic plan view showing details of an electrical distribution scheme which may be used in the invention.

FIG. 9 shows an arrangement wherein the circuitry of the modular luminaire 10 is arranged to supply the LEDs 12 of each one of the heat sinks 14 individually from the power converter 26. This is accomplished by providing each heat sink 14 with a dedicated subcircuit 92, 94, 96, 98, or 100, in the depiction of FIG. 9, which shows five representative heat sinks 14, which will be understood to include LEDs 12 mounted on printed circuit boards 28, as described hereinbefore. This arrangement assures that failure of electric supply to at least one of the LEDs 12 of any one heat sink 14 does not impact operability of LEDs 12 of other heat sinks 14. Because of the overlapping pattern of light projection from the LEDs 12, loss of one LED 12 or even of all of the LEDs 12 of any one heat sink 14 will not result in an unlit area within the original area of full illumination of a modular luminaire such as the modular luminaire 10.

Circuitry will be understood to comprise the number of conductors, and specific connection schemes necessary to carry out the described functions, as well as supporting apparatus such as switches, relays, transducers, circuit breakers, transformers, and voltage dividers, among others, regardless of whether such features are specifically shown. Circuitry and any of its individual components may vary in size, number, location, and logic from that specifically shown or described herein. However, it should be noted that a current regulator 33 (see FIG. 3) may be provided for each heat sink 14, as shown at the left in FIG. 3. Circuitry may have characteristics of conventional LED lights for example, apart from the internal distribution scheme set forth above. For these reasons, circuitry is not specifically called out by reference numerals.

Figure 10:
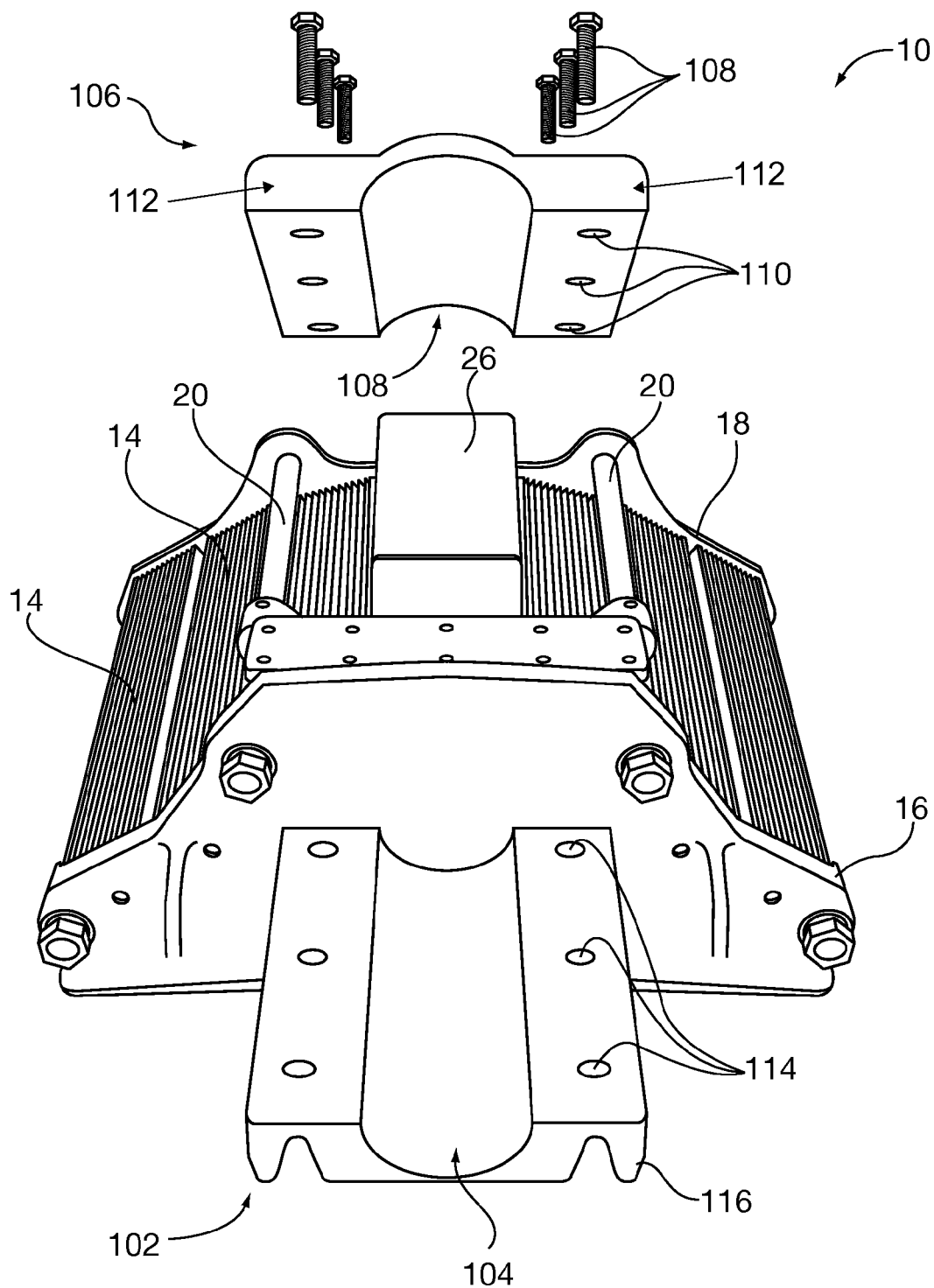
FIG. 10 is an exploded bottom perspective view of the modular luminaire of FIG. 1.

FIG. 10 shows a clamp feature which may be provided as part of the modular luminaire 10. A projection 102 is formed integrally with the proximal end piece 16. This projection 102 (see FIG. 2) may be configured as a trough which presents a generally semi-cylindrical recess 104 to access for receiving a pole (not shown). The pole may be any generally circular pole of the type ordinary used to support street lights, for example. A complementing clamp member 106 bearing a corresponding semi-cylindrical recess 108 may be provided as a separate component, which may be fixed to the projection 102 by fasteners 108. The fasteners 108 may pass through holes 110 formed in a flange 112, and engage holes 114 formed in a corresponding flange 116 of the projection 102. The clamp member 106 may be then tightened over an end of the pole using the fasteners 108. The holes 110, 114 and fasteners 108 may have counterparts on the other side of the projection 102 and the clamp member 106 (these components are called out by reference numeral only on one side of the modular luminaire 10).

Figure 11:
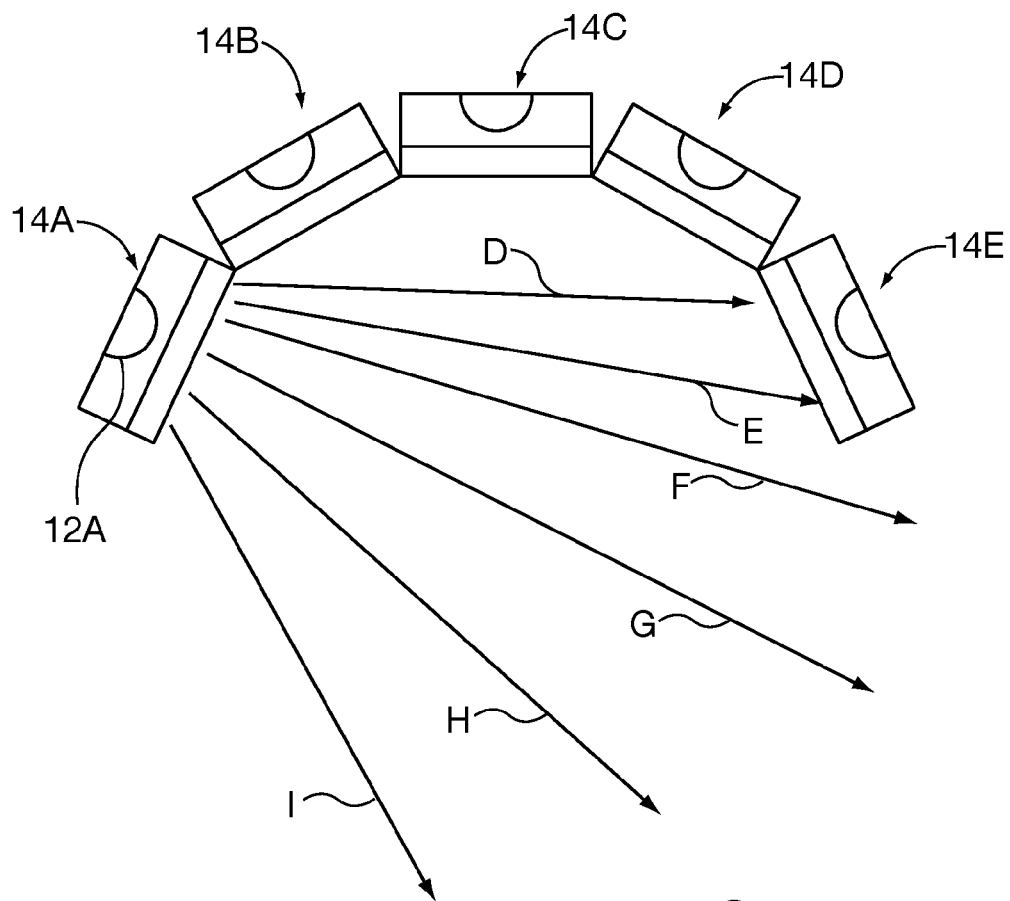
FIG. 11 is a diagrammatic end elevational view of lighting elements of the novel modular luminaire, symbolically showing a light projection pattern.

FIG. 11 shows a further advantage of the module luminaire 10, which in FIG. 11 is mounted above the ground 2 on a pole 4, as is enabled by the clamp arrangement described above. An arcuate array of heat sinks, which may be the heat sinks 14A, 14B, 14C, 14D, and 14E of FIG. 5 for example, each have associated LEDs such as the LED 12A which is mounted on the heat sink 14A. Light projecting from the LED 12A through a lens such as the lens 30A projects in directions represented as rays shown as the arrows D, E, F, G, H, and I. This representation of light emanating as discrete rays is of course only symbolic as the projected light beam is a continuum.

It will be seen that the rays represented as D and E are obstructed by the heat sink 14E, whereas those represented as F, G, H, and I are unobstructed.

Figure 12:
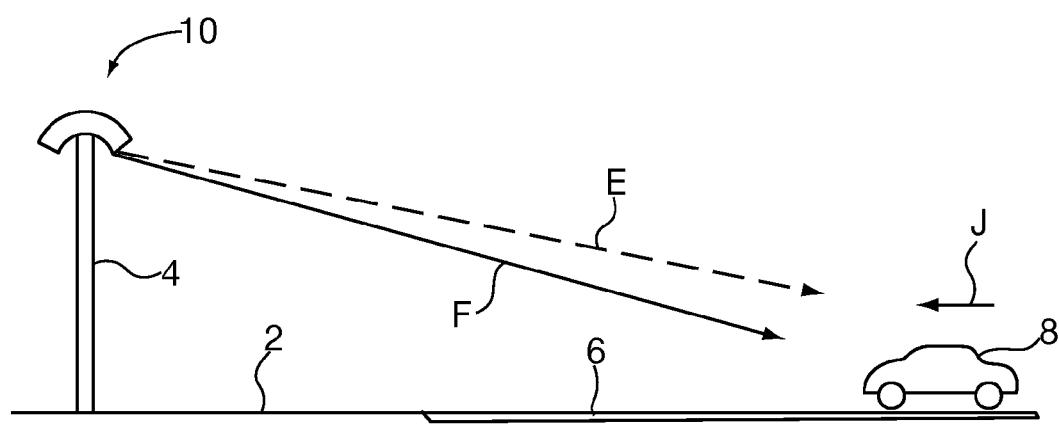
FIG. 12 is an environmental side elevational view of light projection from the novel modular luminaire with the modular luminaire mounted on a pole above the ground.

FIG. 12 shows why partial obstruction of light is advantageous. With the modular luminaire 10 mounted above a roadway 6, light projecting from the modular luminaire 10, which would otherwise shine into the eyes of a driver (not shown) of a motor vehicle 8 traveling towards the pole 4, as indicated by the arrow J, is limited. Rays such as that represented in broken lines as E have been obstructed. Light more directly angled towards the roadway 6 are unobstructed. This greatly limits light impinging upon the driver from great distances, which light would otherwise be seen as glare. This is because at greater distances, light projecting from the modular luminaire 10 is oriented more closely to parallel to the roadway 6. However, such nearly parallel rays are obstructed, with only the more angled light being able to escape the modular luminaire 10. As the driver approaches the modular luminaire 10, his or her view diverges from direct viewing of the light from the modular luminaire 10, the latter now becoming more overhead relative to the driver's eyes. The net effect is that annoying long distance glare is minimized by the arrangement described with respect to FIG. 11.

The LEDs 12 of the present invention may be of any desired hue or color, including white light LEDs.

The circuitry of the modular luminaire 10 may include a photovoltaic charging system if desired.

The present invention is susceptible to modifications and variations which may be introduced thereto without departing from the inventive concepts. For example, although the invention has been described with respect to individual LEDs, it would be possible to provide LEDs in pluralities or clusters (not shown), with each cluster being treated as described priorly with regard to individual LEDs. Also, LEDs need not be arrayed in perfect linear rows as illustrated, provided that a plurality of LEDs is provided along the length of each heat sink, such as the heat sink 14.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A luminaire which uses a plurality of LEDs as a light source, comprising:
    a plurality of heat sinks each having a proximal end, a distal end, a length defined between the proximal end and the distal end, a proximal end piece disposed to support the proximal ends of each one of the heat sinks;
    a distal end piece disposed to support the distal ends of each one of the heat sinks;
    a plurality of through bolts disposed to extend from the proximal end piece to the distal end piece and to unite the proximal end piece and the distal end piece, and to draw the proximal end piece towards the distal end piece while entrapping each one of the heat sinks between the proximal end piece and the distal end piece; and
    electrical supply circuitry disposed to connect electrical power to each one of the LEDs, wherein the electrical supply circuitry comprises a power converter mounted to the luminaire out of contact with the heat sinks.

2. The luminaire of claim 1, wherein the circuitry is arranged to supply the LEDs of each one of the heat sinks individually from the power converter, whereby failure of electric supply to at least one of the LEDs of any one heat sink does not impact operability of LEDs of other heat sinks.

3. The luminaire of claim 1, further comprising a bracket which is mounted to the luminaire and is out of contact with any of the heat sinks, and wherein the power converter is supported on the bracket out of contact with and away from the heat sinks.

4. A luminaire which uses a plurality of LEDs as a light source, comprising:
    a plurality of heat sinks each having a proximal end, a distal end, a length defined between the proximal end and the distal end, a proximal end piece disposed to support the proximal ends of each one of the heat sinks, further comprising a clamp for mounting the proximal end piece to a pole to support the luminaire above the ground, wherein at least part of the clamp is formed integrally with the proximal end piece;
    a distal end piece disposed to support the distal ends of each one of the heat sinks;
    a plurality of through bolts disposed to extend from the proximal end piece to the distal end piece and to unite the proximal end piece and the distal end piece, and to draw the proximal end piece towards the distal end piece while entrapping each one of the heat sinks between the proximal end piece and the distal end piece; and
    electrical supply circuitry disposed to connect electrical power to each one of the LEDs.

5. A luminaire which uses a plurality of LEDs as a light source, comprising:
    a plurality of heat sinks each having a proximal end, a distal end, a length defined between the proximal end and the distal end, a proximal end piece disposed to support the proximal ends of each one of the heat sinks, wherein each one of the heat sinks has a plurality of fastener thread receiving channels extruded thereinto and extending along the length of its associated said heat sink;
    a distal end piece disposed to support the distal ends of each one of the heat sinks;
    a plurality of through bolts disposed to extend from the proximal end piece to the distal end piece and to unite the proximal end piece and the distal end piece, and to draw the proximal end piece towards the distal end piece while entrapping each one of the heat sinks between the proximal end piece and the distal end piece; and
    electrical supply circuitry disposed to connect electrical power to each one of the LEDs.

6. The luminaire of claim 5, wherein for each one of the heat sinks, one of the fastener thread receiving channels is centered within its associated said heat sink, whereby each said heat sink can be angularly adjusted as to its mounting position by threading a fastener into the centered fastener thread receiving channel and rotating the heat sink about its longitudinal axis prior to tightening the through bolts.

* * * * *